United States Patent
Marupaduga (10) Patent No.: US 11,064,372 B1
(45) Date of Patent: Jul. 13, 2021

(54) DYNAMIC RECONFIGURATION OF SECONDARY ACCESS NODE RADIATION PATTERN IN RESPONSE TO THRESHOLD HIGH RATE OF SECONDARY ACCESS NODE ADDITION FAILURES FOR DUAL CONNECTIVITY

(71) Applicant: Sprint Spectrum L.P., Overland Park, KS (US)

(72) Inventor: Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/744,846

(22) Filed: Jan. 16, 2020

(51) Int. Cl.
- H04W 24/02 (2009.01)
- H04W 76/15 (2018.01)
- H04W 4/021 (2018.01)
- H04W 76/18 (2018.01)

(52) U.S. Cl.
CPC .......... *H04W 24/02* (2013.01); *H04W 4/021* (2013.01); *H04W 76/15* (2018.02); *H04W 76/18* (2018.02)

(58) Field of Classification Search
CPC ... H04W 16/32; H04W 72/042; H04W 76/27; H04W 76/28; H04W 88/08; H04W 24/02; H04W 24/04; H04W 36/0005; H04W 36/0009; H04W 36/0055; H04W 36/0058; H04W 36/0066; H04W 36/0069; H04W 36/0072; H04W 36/0079; H04W 4/02; H04W 4/021; H04W 4/029; H04W 48/20; H04W 76/15; H04W 76/18; H04W 48/17; H04W 48/18
See application file for complete search history.

(56) References Cited

U.S. PATENT DOCUMENTS

| | | | |
|---|---|---|---|
| 8,494,527 B2 * | 7/2013 | Noldus | H04L 65/1093 455/436 |
| 8,750,859 B2 | 6/2014 | Lehser | |
| 10,009,811 B2 * | 6/2018 | Hooli | H04W 36/0069 |
| 2006/0084441 A1 | 4/2006 | Dowling | |
| 2008/0049675 A1 * | 2/2008 | Burgan | H04W 36/24 370/331 |
| 2014/0335872 A1 * | 11/2014 | Yamada | H04W 24/04 455/450 |
| 2015/0049681 A1 * | 2/2015 | Huang | H04W 72/1289 370/329 |

(Continued)

FOREIGN PATENT DOCUMENTS

WO   2018203306   11/2018

*Primary Examiner* — Jean A Gelin (57) ABSTRACT

Disclosed is a mechanism to help reconfigure the geographic coverage area of a second access node so as to better cover UEs that experienced connection-addition failures with the second access node. In accordance with the disclosure, a computing system could determine geolocations where UEs that experienced connection-addition failures with the second access node were located when the UEs experienced the connection-addition failures with the second access node. The computing system could then reconfigure the antenna configuration of the second access node in an effort to have the geographic coverage area of the second access node better cover the determined geolocations.

20 Claims, 4 Drawing Sheets

(56) References Cited

U.S. PATENT DOCUMENTS

| | | | |
|---|---|---|---|
| 2015/0264666 A1* | 9/2015 | Yi | H04W 76/27 |
| | | | 370/329 |
| 2015/0341838 A1* | 11/2015 | Pinheiro | H04W 56/001 |
| | | | 455/449 |
| 2016/0192433 A1* | 6/2016 | Deenoo | H04W 72/046 |
| | | | 370/329 |
| 2019/0037417 A1* | 1/2019 | Lei | H04W 72/085 |
| 2019/0229980 A1* | 7/2019 | Han | H04W 24/04 |
| 2020/0059985 A1* | 2/2020 | Henttonen | H04W 76/11 |

* cited by examiner

DYNAMIC RECONFIGURATION OF SECONDARY ACCESS NODE RADIATION PATTERN IN RESPONSE TO THRESHOLD HIGH RATE OF SECONDARY ACCESS NODE ADDITION FAILURES FOR DUAL CONNECTIVITY

BACKGROUND

A cellular wireless network typically includes a number of access nodes that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5GNR" (5GNew Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each coverage area could operate on one or more radio-frequency (RF) carriers, each of which could be frequency division duplex (FDD), defining separate frequency channels for downlink and uplink communication, or time division duplex (TDD), with a single frequency channel multiplexed over time between downlink and uplink use.

Further, on the downlink and uplink, each carrier could be structured to define various physical channels including time-frequency resources for carrying information between the access nodes and UEs. For example, the air interface could be divided over time into frames, each divided in turn into subframes and timeslots, and the carrier bandwidth (frequency width of the carrier on the downlink and/or uplink) could be divided over frequency into subcarriers, which could be grouped within each subframe and timeslot to define physical resource blocks (PRBs) in which the subcarriers can be modulated to carry data.

In addition, certain resources on the downlink and/or uplink of each such carrier could be reserved for special purposes. For instance, on the downlink, certain resources could be reserved to carry synchronization signals that UEs could detect as an indication of coverage, other resources could be reserved to carry a reference signal that UEs could measure in order to determine coverage strength, still other resources could be reserved to carry other downlink control-plane signaling from the access node to UEs, and other resources could be reserved to carry scheduled user-plane communications from the access node to UEs. And on the uplink, certain resources could be reserved to carry uplink control-plane signaling from UEs to the access node, and other resources could be reserved to carry scheduled user-plane communications from UEs to the access node.

Overview

In example operation, when a UE enters into coverage of such a network, the UE could initially scan for and detect threshold strong coverage of an access node on a carrier, and the UE could responsively engage in signaling with the access node to establish a Radio Resource Control (RRC) connection between the UE and the access node. Further, if appropriate, the UE could then engage in attach signaling, via the access node, with a core-network controller to attach and thus register for service, and the core-network controller and access node could coordinate setup for the UE of a user-plane bearer, including an access bearer that extends between the access node and a core-network gateway system providing connectivity with a transport network and a data-radio bearer (DRB) that extends over the air between the access node and the UE.

Once the UE is connected and attached, the access node could then serve the UE with packet-data communications.

For instance, when the core-network gateway system receives packet data for transmission to the UE, the data could flow over the UE's access bearer to the access node, and the access node could buffer the data, pending transmission of the data over the UE's DRB to the UE. With the example air-interface configuration noted above, the access node could then allocate downlink PRBs in an upcoming subframe for carrying at least some of the data to the UE. And in that subframe, the access node could transmit to the UE a scheduling directive that indicates which PRBs will carry the data, and the access node could transmit the data to the UE in those PRBs.

Likewise, on the uplink, when the UE has packet data for transmission on the transport network, the UE could buffer the data, pending transmission of the data over the UE's DRB to the access node, and the UE could transmit to the access node a scheduling request that carries a buffer status report (BSR) indicating the quantity of data that the UE has buffered for transmission. With the example air-interface configuration, the access node could then allocate uplink PRBs in an upcoming subframe to carry at least some of the data from the UE and could transmit to the UE a scheduling directive indicating those upcoming PRBs, and the UE could responsively transmit the data to the access node in those PRBs.

As the industry advances from one generation of RAT to the next, networks and UEs may be configured to support service on multiple RATs at once. With the transition from 4G LTE to 5G NR, for instance, networks and UEs may be configured to support use of both technologies concurrently, with an arrangement referred to as EUTRA-NR Dual Connectivity (EN-DC). With such an arrangement, a UE might include a 4G radio and a 5G radio, and the 4G radio could be served by a 4G access node (evolved Node-B (eNB))

concurrently with the 5G radio being served by a 5G access node (next generation Node-B (gNB)). This arrangement could help support transition from 4G technology to 5G technology and could also facilitate higher peak data rate of communication by allowing data to be multiplexed over 4G and 5G connections, among possibly other benefits.

More generally, dual connectivity could encompass connectivity on two or more RATs concurrently, to facilitate technology transitions or for other purposes. Dual connectivity can thus be distinguished from standalone connectivity, where a UE is served on just one RAT, such as just 4G LTE for instance.

In some dual-connectivity arrangements, an access node operating under a first RAT could serve as a master node (MN), responsible for RRC signaling with the UE, responsible for coordinating setup and teardown of dual-connectivity service for the UE, and functioning as an anchor point for core-network control signaling related to the dual-connected UE. And an access node operating under a second RAT could serve as a secondary node (SN), to provide increased data capacity for the UE for instance. With EN-DC, for example, a 4G eNB could operate as the MN (referred to as an MeNB), and a 5G gNB could operate as the SN (referred to as an SgNB).

These access nodes could be collocated in a common cell site, possibly sharing an antenna tower, and could be configured to provide coverage in generally the same direction and of generally the same scope as each other. Alternatively, the access nodes could be at separate cell sites but still configured to provide substantially overlapping or coterminous coverage.

When the UE enters into coverage of such a system, the UE could initially scan for coverage under the first RAT and discover threshold strong coverage of the MN, and the UE could responsively engage in signaling as discussed above to establish for the UE an RRC connection. Further, the UE could engage in attach signaling with a core-network controller, via the UE's established RRC connection, and the core-network controller and MN could coordinate establishment for the UE of an access bearer and DRB as noted above. Here, the DRB and/or other service parameters that the MN configures to support the MN's air-interface service of the UE could define for the UE a first-RAT connection.

The MN could then serve the UE in a first-RAT standalone mode (i.e., under just the first RAT) with packet-data communications as described above. For instance, when the core network has data to send to the UE, the data could flow to the MN, and the MN could schedule and provide transmission of the data on downlink PRBs to the UE, with the UE monitoring for scheduling directives and reading the data from the downlink PRBs. And when the UE has data to send, the UE could transmit a scheduling directive to the MN, the MN could schedule transmission of the data on uplink PRBs from the UE, and the UE could monitor for scheduling directives and transmit the data on the scheduled uplink PRBs.

In addition, once the UE is connected with the MN, the MN could engage in a process to coordinate setup of dual-connectivity for the UE, so that the UE can be served concurrently by the MN and the SN.

To do so, the MN could first engage in a connection-addition process to add for the UE a second-RAT connection between the UE and the SN, so that the MN and SN can then cooperatively provide the UE with dual-connectivity service over their respective connections with the UE. In an example implementation, for instance, the MN could transmit to the SN a connection-addition request message, providing RRC and DRB configuration information and other information for the second-RAT connection, and the SN could then responsively allocate resources for the second-RAT connection and reply to the MN with an SN-addition-request acknowledge message. The MN could then transmit to the UE an RRC connection-reconfiguration message providing the UE with parameters of the second-RAT connection. And the UE could respond to the MN with a reconfiguration-complete message, which the MN could forward to the SN. Further, the UE could then engage in random-access signaling with the SN so as to complete establishment of the second-RAT connection for the UE.

Further, for some dual-connectivity implementations, the MN could also engage in signaling process to transfer the UE's access-bearer from being between the gateway system and the MN to instead being between the gateway system and the SN. For instance, the MN could include in its SN-addition request to the SN information about the access bearer, and the MN could transmit to the core-network controller an access-bearer modification request and the core-network controller could update the gateway system so as to transfer the access-bearer from the MN to the SN.

With dual-connectivity so configured by way of example, the MN and SN could then serve the UE with packet-data communications over their respective connections with the UE, with each access node coordinating air-interface communication in the manner described above. For instance, downlink data could flow over the UE's access bearer from the gateway system to the SN, the SN could transmit a portion of the data over the UE's second-RAT connection to the UE, and the SN could send another portion of the data to the MN, which the MN could transmit to the UE over the UE's first-RAT connection. Likewise, when the UE has data to transmit, the UE could transmit a portion of the data over the UE's first-RAT connection to the MN, which the MN could forward to the SN and the SN could transmit over the UE's access bearer to the gateway system, and the UE could transmit another portion of the data over the UE's second-RAT connection to the SN, which the SN could transmit over the UE's access bearer to the gateway system.

While the above procedure for configuring dual-connectivity may work well in practice, in some cases the connection-addition process to add for the UE the second-RAT connection could fail. For instance, if the UE is located in poor coverage of the SN when the MN attempts to add for the UE the second-RAT connection, then the attempt by the MN to add for the UE the second-RAT connection could fail. Such a connection-addition failure could occur because, due to its poor coverage, the UE is unable to successfully detect downlink synchronization signals broadcasted by the SN. Or, such a connection-addition failure could occur because, due to its poor coverage, the UE is unable to successfully engage in random-access signaling with the SN so as to establish the second-RAT connection. Other reasons for the connection-addition failure could exist as well.

After experiencing a failure of the connection-addition process, the UE could notify the MN that the UE was unable to establish the second-RAT connection with the SN. In response to this, the MN could reattempt the connection-addition process by transmitting an RRC connection-reconfiguration message with parameters for the UE to establish the second-RAT connection with the SN. However, if the coverage conditions between the UE and the SN remain the same as during the initial failed attempt to establish the second-RAT connection, then subsequent attempts by the MN to add for the UE the second-RAT connection would also likely fail.

Disclosed herein is a mechanism to help address this technical problem. In accordance with the disclosure, a computing system could detect threshold many occurrences of such connection-addition failures between UEs and the SN. The computing system could then determine the geolocations where the UEs were located when the UEs experienced the connection-addition failures and could responsively adjust the antenna configuration of the SN based on a consideration of the determined geolocations. In doing so, the SN could be reconfigured to have a geographic coverage area that provides improved coverage to the determined geolocations.

The computing system could detect such connection-addition failures between UEs and the SN in various ways. As one example, the computing system could receive connection-addition failure reports from UEs that experienced connection-addition failures with the SN. These failure reports could include geolocations of the UEs when the UEs experienced the connection-addition failures with the SN as well as timestamps from the UEs indicating the time periods that the UEs experienced the connection-addition failures with the SN. The computing system could use the information provided in these failure reports as a basis to reconfigure the antenna configuration of the SN.

In practice, the computing system could include or have access to data that defines mappings between (i) antenna configurations for the SN and (ii) geographic coverage areas for the SN. The antenna configurations could be based on one or more antenna parameters, such as azimuth, beamwidth and/or tilt, of the SN. The computing system could refer to these mappings to determine an antenna configuration for the SN that would provide a geographic coverage area encompassing the determined connection-addition failure locations. Accordingly, the computing system could then cause the antenna configuration of the SN to be adjusted to serve the geographic coverage area.

After the computing system reconfigures the geographic coverage area of the SN, subsequent attempts by the MN to add for UEs second-RAT connections with the SN may be successful because the UEs may be located in a better coverage area of the SN.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of a system that supports 4G LTE service, 5G NR service, and EN-DC service. However, it should be understood that the disclosed principles could extend to apply in other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways. In addition, operations described as being performed by one or more entities could be implemented in various ways, such as by processing unit executing instructions stored in non-transitory data storage, along with associated circuitry or other hardware, among other possibilities.

Figure 1:
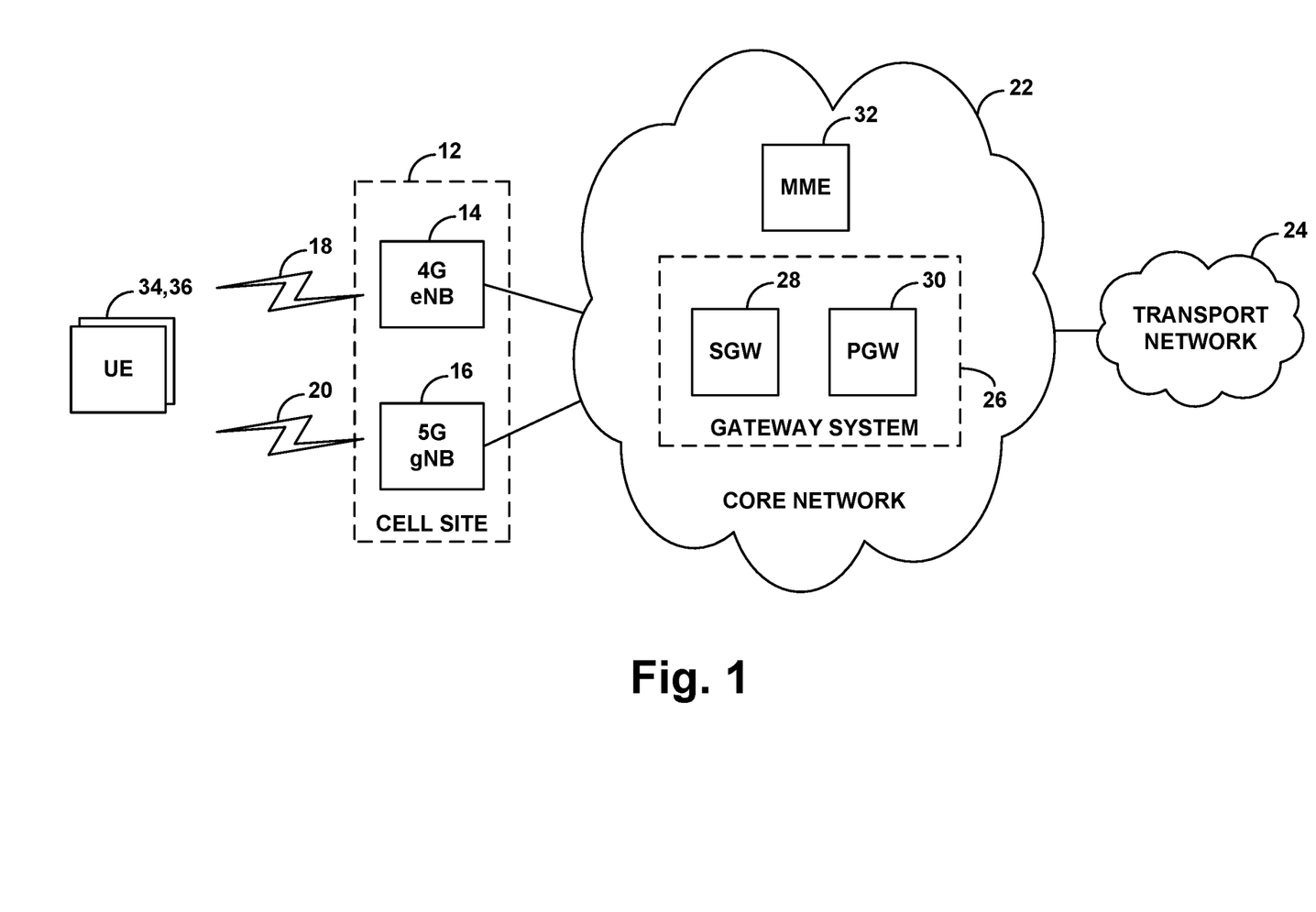
FIG. 1 is a simplified block diagram of an example network arrangement in which aspects of the present disclosure can be implemented.

FIG. 1 is a simplified block diagram of an example network arrangement having a cell site 12 that includes a 4G eNB 14 and a 5G gNB 16. These access nodes could be macro access nodes of the type configured to provide a wide range of coverage or could take other forms, such as small cell access nodes, repeaters, femtocell access nodes, or the like, possibly configured to provide a smaller range of coverage.

Each access node could have a respective antenna structure that is configured to transmit and receive electromagnetic signals in an area defined by an antenna configuration or radiation pattern. That is, the antenna configuration defines a geographic coverage area in which the access node can engage in downlink transmission to UEs and receive uplink transmission from UEs. In particular, the antenna configuration may define a main lobe and could be characterized by an azimuth angle, an elevation angle, and a beamwidth. In polar coordinates, the azimuth angle defines a direction of radiation of the main lobe within a horizontal plane, as an angle of rotation around a vertical axis (in relation to North (zero degrees) for instance), the elevation angle defines a direction of radiation of the main lobe within a vertical plane, as an angle of rotation around a horizontal axis (in relation to the horizon for instance), and the beamwidth defines an angular width of the main lobe within the horizontal plane, typically measured between half-power (−3 dB) points of the main lobe for instance.

In practice, the antenna structures of the access nodes could be collocated with each other, such as by being mounted on a common antenna tower and/or being in a common housing. Further, the azimuth angle, elevation angle, and beamwidth of either or each access node's antenna configuration could be structured so that the intended coverage areas for the two access nodes are the same or are in a similar direction and scope, i.e., largely coterminous coverage, even though the access nodes may be operating on different frequencies with different path loss than each other. There could also be some variation between the access nodes' respective coverage areas.

Each access node could provide coverage on one or more carriers according to a respective radio access technology. For instance, the 4G eNB 14 could provide 4G coverage 18 on one or more 4G carriers, and the 5G eNB 16 could provide 5G coverage 20 on one or more 5G carriers.

In an example implementation, the respective coverage on each carrier could be divided over time into frames, subframes, timeslots, and symbol segments, and could be divided over carrier frequency bandwidth into subcarriers. As a result, the respective coverage could define an array of time-frequency resource elements, in which subcarriers can be modulated to carry data communications. Further, in each subframe, these resource elements could be divided into groups defining the PRBs noted above, which could be allocable by the associated access node on an as-needed basis to carry data communications as noted above. And certain resource elements per subframe could be reserved for other purposes as further discussed above.

The 4G air interface and 4G service provided by 4G eNB 14 could differ from the 5G air interface and 5G service provided by the 5G gNB 16 in various ways now known or later developed. For example, one may provide variable subcarrier spacing, and the other may provide fixed subcarrier spacing. As another example, one may have different symbol time segments than the other. As still another example, one may make use of different MIMO technologies than the other. And as yet another example, with TDD carriers, one may have a flexible TDD configuration and the other may have a fixed TDD configuration. Other examples are possible as well.

In the example arrangement of FIG. 1, the 4G eNB 14 and 5G gNB 16 are both interfaced with a core network 22, which could be an evolved packet core (EPC) network, a next generation core (NGC) network, or another network including components that may provide connectivity with at least one transport network 24, such as the Internet. In an example implementation as shown, the core network includes a gateway system 26 having a serving gateway (SGW) 28 and a packet-data network gateway (PGW) 30, which provides user-plane connectivity with the transport network 24. Further, the core network includes a mobility management entity (MME) 32, which serves as a core-network controller. Other core-network arrangements are also possible.

FIG. 1 also illustrates one or more example UEs 34, 36 within coverage of 4G eNB 14 and 5G gNB 16. Each of these UEs could take any of the forms noted above, among other possibilities. Further, some or all of the UEs could be equipped with a 4G LTE radio, a 5G NR radio, and associated circuitry and logic that enables the UEs to engage in 4G LTE service, 5G NR service, and EN-DC service. And some of the UEs might be equipped with just a 4G LTE radio and associated circuitry and logic that enables the UEs to engage in 4G LTE service, or just a 5G LTE radio and associated circuitry and logic that enables the UEs to engage in just 5G NR service.

In line with the discussion above, when a 4G-capable UE 34 initially enters into coverage of this network, the UE 34 could discover coverage of the 4G eNB 14, such as by scanning predefined 4G carriers to find a synchronization signal from the 4G eNB 14 and then determining that a reference signal from the 4G eNB 14 is strong enough to justify connecting. The UE could then engage in random-access signaling and RRC signaling with the 4G eNB 14 to establish an RRC connection, and the 4G eNB 14 could establish a context record indicating the state of the UE's 4G connection and service.

With its RRC connection established, the UE 34 could then transmit to the 4G eNB 14 an attach request message, which the 4G eNB 14 could forward to the MME 32 for processing. And upon authenticating and authorizing the UE for service, the MME 32 and 4G eNB 14 could coordinate setup for the UE 34 of at least one user-plane bearer. In particular, the MME 32 could engage in signaling with the 4G eNB 14 and the SGW 28 to coordinate setup for the UE 34 of an S1-U packet tunnel between the 4G eNB 14 and the SGW 28, and the SGW 28 could responsively engage in signaling with the PGW 30 to coordinate setup for the UE 34 of an associated S5 packet tunnel between the SGW 28 and the PGW 30. Further, the 4G eNB 14 could engage in signaling with the UE 34 to establish a DRB and other configuration parameters cooperatively defining a 4G connection for the UE 34.

As a last step of this attachment process, the 4G eNB 14 could also transmit to the UE 34 an RRC message carrying a UE-capability enquiry, and the UE 34 could respond to the 4G eNB 14 with a "UE capability information" information element (IE), which could indicate whether the UE 34 is EN-DC capable. Alternatively, the 4G eNB 14 could receive the UE capability information from the MME 32 (which the MME 32 could obtain from a home subscriber server (not shown) or the like).

If the UE 34 is EN-DC capable, the 4G eNB 14 could then work to configure EN-DC service for the UE 34. In line with the discussion above, for instance, the 4G eNB 14, operating as an MeNB, could first engage in process to add the 5G gNB 16 as an SgNB for the UE 34, such as by transmitting to the 5G gNB 16 an SgNB-Addition request to cause the 5G gNB to allocate resources for a 5G connection for the UE 34 on one or more 5G carriers, receiving an SgNB-Addition-Request acknowledge message from the 5G gNB 16, and engaging in associated RRC signaling with the UE 34, in response to which the UE 34 could then access and complete establishment of the 5G connection. Further, the 4G eNB 14 could engage in signaling as described above to transfer to the UE's access bearer to the 5G gNB as well. The 4G eNB 14 and 5G gNB 16 could then provide the UE 34 with EN-DC service, concurrently serving the UE 34 over their respective connections with the UE 34. Namely, the 4G eNB 14 could allocate PRBs of its 4G air interface as needed to carry data over the 4G connection between the 4G eNB 14 and the UE 34, and the 5G gNB could allocate PRBs of its 5G air interface as needed to carry data over the 5G connection between the 5G gNB 16 and the UE 34.

As noted above, in some situations the connection-addition process to add for the UE 34 a 5G connection the 5G gNB 16 could fail. For example, when the 4G eNB 14 first engages in the process to add the 5G gNB 16 as an SgNB for the UE 34, the UE 34 could be located in poor coverage of the 5G gNB 16. Consequently, the 5G gNB 16 may be unable to establish the 5G connection for the UE 34 because the UE 34 may not successfully detect downlink synchronization signals broadcasted by the 5G gNB 16 or the UE 34 may not successfully engage in random-access signaling with the 5G gNB 16 so as to establish the 5G connection. Other reasons for the connection-addition failure exist as well.

Multiple instances of such connection-addition failures between UEs and the 5G gNB 16 could occur. For example, in addition to the 4G eNB 14 engaging in the process to add the 5G gNB 16 as an SgNB for the UE 34, the 4G eNB 14 could also engage in a process to add the 5G gNB 16 as an SgNB for one or more other UEs 36. As with the UE 34, the connection-addition processes to add for the one or more other UEs 36 a 5G connection with the 5G gNB 16 could likewise fail.

In line with the discussion above, the present disclosure provides for a computing system detecting threshold many occurrences of such connection-addition failures between UEs and the 5G gNB 16. The computing system could then determine the geolocations where the UEs were located when the UEs experienced the connection-addition failures and could responsively adjust the antenna configuration of the 5G gNB 16 based on a consideration of the determined geolocations. In particular, the computing system could reconfigure the geographic coverage area of the 5G gNB 16 to help provide improved coverage at the determined geolocations.

The computing system that carries out this process could be implemented by various entities. In one example, the computing system is implemented by the 4G eNB 16. For instance, the 4G eNB 16 could detect threshold many connection-addition failures between UEs and the 5G gNB 16 and then could reconfigure the geographic coverage area of the 5G gNB 16 to help provide improved coverage at the geolocations where the UEs were located when the UEs experienced the connection-addition failures.

In another example, the computing system is implemented by an element management system (EMS) disposed within the core network 22 and communicatively connected to the 4G eNB 14. In such an example, the 4G eNB 14 could forward connection-addition failure information to the EMS, which in turn could detect threshold many connection-addition failures between UEs and the 5G gNB 16 and then could responsively reconfigure the geographic coverage area of the 5G gNB 16 to help provide improved coverage at the geolocations where the UEs were located when the UEs experienced the connection-addition failures.

For simplicity, example implementations will now be described using a computing system implemented by the 4G eNB 16. However, it should be understood that the disclosed principles could apply in other scenarios with other entities as well.

In an example implementation, the 4G eNB 16 could learn of the connection-addition failures with respect to the 5G gNB 16 based on connection-addition failure reports received from UEs that experienced connection-addition failures with the 5G gNB 16. Various mechanisms to determine the occurrence of such connection-addition failures are possible. For example, when a UE first receives from the 4G eNB 14 a RRC connection-reconfiguration message providing the UE with parameters to establish a 5G connection with the 5G gNB 16, the UE could initiate a timing sequence. Then, if the UE cannot not establish a 5G connection with the 5G gNB 16 within a threshold amount of time (e.g., 10 milliseconds, 1 second) from the initiation of the timing sequence, the UE could determine that a connection-addition failure with the 5G gNB 16 has occurred.

Upon determining the occurrence of a connection-addition failure with the 5G gNB 16, a UE could transmit to the 4G eNB 14 (e.g., in a RRC message) a connection-addition failure report indicating that the UE failed to establish a 5G connection with the 5G gNB 16. Multiple instances of such connection-addition failure reports with respect to the 5G gNB 16 could be transmitted by UEs to the 4G eNB 14. By tracking these failure reports, the 4G eNB 14 could detect when threshold many connection-addition failures with respect to the 5G gNB 16 have occurred.

The threshold here could be a matter of engineering design choice or automated analysis, possibly based on historical connection-addition failures with respect to the 5G gNB 16 and/or based on other analysis. In some cases, the threshold is a predefined value greater than one. Further, the predefined value could be a value stored on or accessible to the 4G eNB 14.

In an example implementation, the threshold could be a predefined threshold quantity of connection-addition failures with respect to the 5G gNB 16, in which case the 4G eNB 14 could determine whether the number of connection-addition failures meets or exceeds the predefined threshold quantity. For example, if the predefined threshold quantity is two and the 4G eNB 14 receives three connection-addition failure reports with respect to the 5G gNB 16, then the 4G eNB 14 could make a determination that the threshold many connection-addition failures have occurred.

In other implementations, the threshold could be a predefined threshold rate of connection-addition failures with respect to the 5G gNB 16, in which case the 4G eNB 14 could determine whether the rate of connection-addition failures meets or exceeds the predefined threshold rate. For instance, if the predefined threshold rate is ten connection-addition failures per an hour and the 4G eNB 14 receives connection-addition failures reports with respect to the 5G gNB 16 at a rate of twenty per an hour, then the 4G eNB 14 could make a determination that the threshold many connection-addition failures have occurred.

In some situations, when determining whether threshold many connection-addition failures with respect to the 5G gNB 16 have occurred, the 4G eNB 14 could include in its determination two or more connection-addition failures that involve the same UE. For instance, as described above, a UE could transmit to the 4G eNB 14 a connection-addition failure report indicating that the UE failed to establish a 5G connection with the 5G gNB 16. If the 5G gNB 16 (or the 4G eNB 14) then reattempts establishing the 5G connection with the UE and that reattempt likewise fails, the UE could transmit to the 4G eNB 14 a second connection-addition failure report indicating that the UE again failed to establish a 5G connection with the 5G gNB 16. Alternatively, when making a determination on whether threshold many connection-addition failures with respect to the 5G gNB 16 have occurred, the 4G eNB 14 could include in its determination only connection-addition failures that involve different UEs.

Further, in some situations, the 4G eNB 14 could detect threshold many connection-addition failures with respect to the 5G gNB 16 over a sliding window of time. For instance, the 4G eNB 14 could limit its detection to only connection-addition failures that occurred during a time window (e.g., ten minute window, hour window, etc.) and could ignore connection-addition failures that occurred before the time window or after the time window.

Once the 4G eNB 14 detects threshold many connection-addition failures with respect to the 5G gNB 16, the 4G eNB 14 could determine, for the UEs that experienced the connection-addition failures, the geolocations where the UEs were located when the UEs experienced the connection-addition failures. Various mechanisms to determine these geolocations are possible. For example, each connection-addition failure report from a UE could include information on the geolocation of the UE where the UE was located when the UE experienced the connection-addition failure. Accordingly, the 4G eNB 14 could determine the geolocation of the UE when the UE experienced the connection-addition failure by using the information provided in the failure report.

As another example, the 4G eNB 14 could determine the geolocations by correlating timestamps in the connection-addition failure reports with timestamps of location data that tracks UE locations. For instance, each connection-addition failure report from a UE could include a timestamp indicating when the UE experienced the connection-addition failure with respect to the 5G gNB 16. And the 4G eNB 14 could have access to location data that includes timestamps of UE location over time, established by a mobile location system or the like. By correlating the timestamps provided by the UE connection-addition failure reports with the timestamps in the location data, the 4G eNB 14 could thereby determine the geolocation where the UE was located at the time the UE experienced the connection-addition failure. Other examples are possible as well.

With the geolocations determined, the 4G eNB 14 could work to reconfigure the antenna configuration of the 5G gNB 16 in an effort to have the 5G gNB 16 provide improved coverage at the determined geolocations. In particular, the 4G eNB 14 could work to transition the 5G gNB 16 from having a first geographic coverage area to instead having a second geographic coverage area that provides improved coverage at the determined geolocations.

To perform this reconfiguration, the 4G eNB 14 could include or could have access to data that defines various preset antenna configurations of the 5G gNB 16. For instance, the data could specify a geographic scope of coverage respectively for each preset antenna configuration. The 4G eNB 14 could thus refer to that data to determine which of the preset antenna configurations would allow the 5G gNB 16 to provide the best coverage at the geographic locations where the UEs where located at the time the UEs experienced the connection-addition failures with the 5G gNB 16.

In an example implementation, the data could include mappings between (i) antenna configurations for the 5G gNB 16 and (ii) geographic coverage areas for the 5G gNB 16. Each of the antenna configurations in the mappings could be characterized one or more antenna parameters, such as an azimuth angle, an elevation angle, and a beamwidth. Further, each of the geographic coverage areas in the mappings could be characterized by geographic coordinates (e.g., latitude and longitude coordinates) that define the geographic coverage area.

Accordingly, the 4G eNB 14 could determine, for each antenna configuration specified by the mapping data, whether or not the antenna configuration has an associated geographic coverage area that provides improved coverage to the determined geolocations. This could involve, for example, the 4G eNB 14 determining whether the associated geographic coverage area encompasses all the determined geolocations. Or, this could involve the 4G eNB 14 determining whether the associated geographic coverage area encompasses a majority (e.g., above 50% or above 75%) of the determined geolocations. Further, this could involve the 4G eNB 14 determining whether the associated geographic coverage area provides threshold strong coverage at all or at a majority of the determined geolocations. Even further, this could involve the 4G eNB 14 determining whether a specific region within the associated geographic coverage area (e.g., the centermost 50% of the associated geographic coverage area) encompasses a majority of the determined geolocations. Other variations are possible as well.

In a scenario where the 4G eNB 14 determines that two or more antenna configurations have associated geographic coverage areas that provide improved coverage to the determined geolocations, the 4G eNB 14 could select, from the two or more configurations, an antenna configuration that least differs (e.g., has the least amount of changes in azimuth angle, elevation angle, and beamwidth) from a current antenna configuration of the 5G gNB 16. For instance, the 4G eNB 14 could determine the current antenna configuration of the 5G gNB 16 by engaging signaling with the 5G gNB 16 to determine the current antenna configuration of the 5G gNB 16 and then could use that current antenna configuration as a basis to perform the selection. Alternatively, the 4G eNB 14 could select, from the two or more configurations, an antenna configuration that most differs from the current antenna configuration of the 5G gNB 16.

In some implementations, after the 4G eNB 14 first discovers an antenna configuration having an associated geographic coverage area that provides improved coverage to the determined geolocations, the 4G eNB 14 could simply select that antenna configuration without continuing the process to determine whether other antenna configurations of the 5G gNB 16 have associated geographic coverage areas that provide improved coverage to the determined geolocations.

Once the 4G eNB 14 selects an antenna configuration having an associated geographic coverage area that provides improved coverage to the determined geolocations, the 4G eNB 14 could cause a reconfiguration of the 5G gNB 16 so that the 5G gNB's antenna structure is arranged in accordance with the selected antenna configuration.

The 4G eNB 14 could do this in various ways. As one example, the 4G eNB 14 could transmit to the 5G gNB 16 a directive that causes the 5G gNB 16 to adjust its antenna parameters, such as its azimuth, elevation, beamwidth and/or possibly other antenna parameters such antenna phase, amplitude, or the like, to be in accordance with the selected antenna configuration. The 5G gNB 16 could be configured to respond to the directive by reconfiguring its antenna parameters to be in accordance with the selected antenna configuration, thereby adjusting its geographic coverage area to provide improved coverage to the determined geolocations.

Alternatively, rather than directing the 5G gNB 16, the 4G eNB 14 could generate a trouble-ticket containing instructions to adjust the antenna configuration of the 5G gNB 16. The 4G eNB 14 could communicate the trouble-ticket to an entity that operates the 5G gNB 16, which in turn could provide the trouble-ticket to an operator. Then, the operator could use the instructions in the trouble-ticket to manually adjust the physical orientation, azimuth angle, elevation angle, and/or beamwidth of the 5G gNB 16 or possibly other elements of the 5G gNB's antenna structure. Other mechanisms for reconfiguring the 5G gNB 16 are possible as well.

Figure 2:
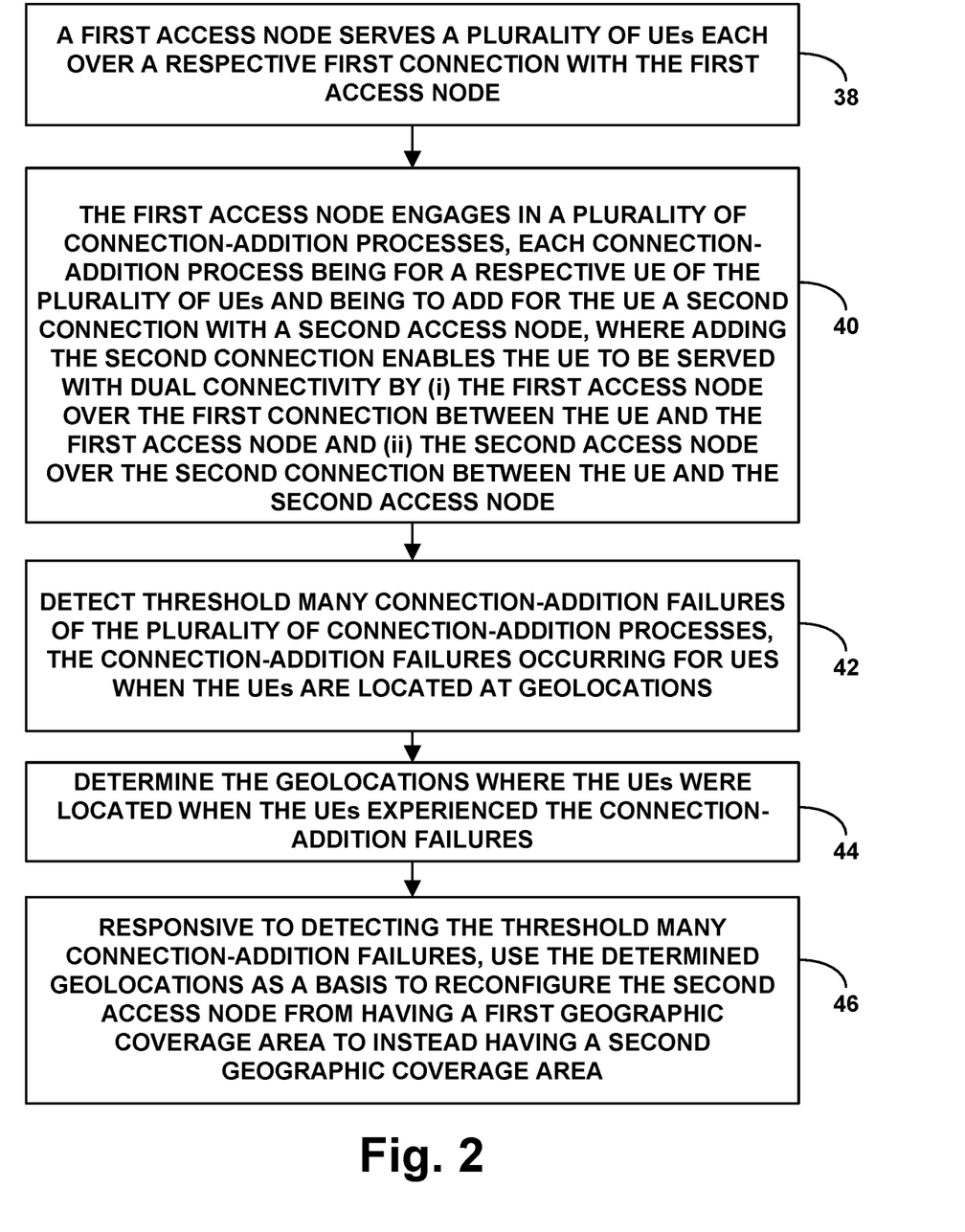
FIG. 2 is a flow chart depicting an example method in accordance with the disclosure.

FIG. 2 is a flow chart depicting an example method that can be carried out to reconfigure a second access node from having a first geographic coverage area to instead having a second geographic coverage area. As described above, aspects of the method could be implemented by a first access node (e.g., the 4G eNB 14), by an EMS, and/or by one or more other entities.

As shown in FIG. 2, at block 38, the method includes a first access node serving a plurality of UEs each over a respective first connection with the first access node. And at block 40, the method then includes the first access node engaging in a plurality of connection-addition processes, each connection-addition process being for a respective UE of the plurality of UEs and being to add for the UE a second connection with a second access node, where adding the second connection enables the UE to be served with dual connectivity by (i) the first access node over the first connection between the UE and the first access node and (ii) the second access node over the second connection between the UE and the second access node.

Further, at block 42, the method includes detecting threshold many connection-addition failures of the plurality of connection-addition processes, the connection-addition failures occurring for UEs when the UEs are located at geolocations.

Additionally, at block 44, the method includes determining the geolocations where the UEs were located when the UEs experienced the connection-addition failures. And at block 46, the method includes, responsive to detecting the threshold many connection-addition failures, using the determined geolocations as a basis to reconfigure the second access node from having a first geographic coverage area to instead having a second geographic coverage area.

In line with the discussion above, detecting the threshold many connection-addition failures many could be performed by the first access node. Alternatively, the detecting could be performed by an EMS communicatively connected to the first access node and the second access node.

Further, as discussed above, detecting the threshold many connection-addition failures of the plurality of connection-addition processes could involve detecting at least a predefined threshold quantity of connection-addition failures of the plurality of connection-addition processes. In some implementations, the predefined threshold quantity is at least two.

Alternatively or additionally, detecting the threshold many connection-addition failures of the plurality of connection-addition processes could involve detecting at least a predefined threshold rate of connection-addition failures of the plurality of connection-addition processes.

Still further, as discussed above, detecting the threshold many connection-addition failures of the plurality of connection-addition processes could involve detecting threshold many connection-addition failures of the plurality of connection-addition processes over a sliding window of time.

Yet further, as discussed above, detecting the threshold many connection-addition failures of the plurality of connection-addition processes could involve receiving, for each of the connection-addition failures, from a UE that experienced the connection-addition failure, a connection-addition failure report indicating that the UE experienced the connection-addition failure.

In a representative implementation as discussed above, reconfiguring the second access node from having the first geographic coverage area to instead having the second geographic coverage area could involve reconfiguring the second access node so that the second access node provides improved coverage at the determined geolocations.

For instance, the first access node could include or have access to data that defines mappings between (i) antenna configurations for the second access node and (ii) geographic coverage areas of the second access node. The second access node could have a first antenna configuration and reconfiguring the second access node so that the second access node provides improved coverage at the determined geolocations could involve selecting, from the mappings, a second antenna configuration with an associated geographic coverage area that encompasses a geographic area defined by the determined geolocations and reconfiguring the second access node from having the first antenna configuration to instead having the second antenna configuration.

In a representative implementation, reconfiguring the second access node from having the first antenna configuration to instead having the second antenna configuration could include adjusting one or more antenna parameters of the second access node, the one or more antenna parameters selected from a group consisting of azimuth, beamwidth, and tilt.

Further, as discussed above, reconfiguring the second access node could involve generating a trouble-ticket containing instructions to transition the second access node from having the first geographic coverage area to instead having the second geographic coverage area.

Alternatively, as discussed above, reconfiguring the second access node could involve transmitting, to the second access node, a directive to which the second access node is configured to respond by reconfiguring itself from having the first geographic coverage area to instead having the second geographic coverage area.

In line with the discussion above, the first connection between the UE and the first access node could be according to a first radio access technology (RAT). The first RAT could be, for example, a 4G connection. Further, the second connection between the UE and the second access node could be according to a second RAT. The second RAT could be, for example, a 5G connection.

As discussed above, in this method, at least one of the connection-addition failures could involve, during the connection-addition process for the respective UE, the UE failing to detect a synchronization signal block (SSblock) broadcast by the second access node.

Further, as discussed above, in this method, at least one of the connection-addition failures involves, during the connection-addition process for the respective UE, failure of random-access signaling between the UE and the second access node.

Figure 3:
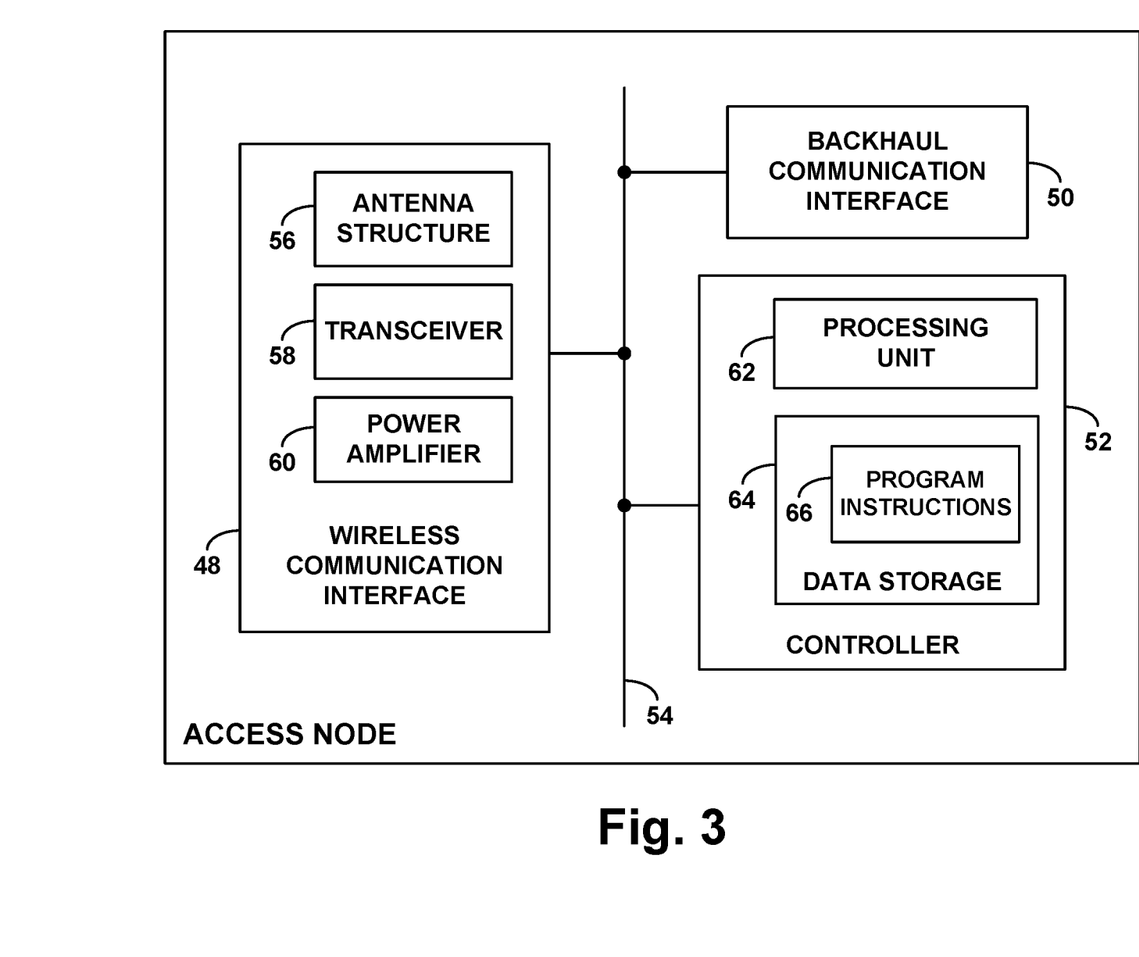
FIG. 3 is a simplified block diagram of an example access node operable in accordance with the disclosure.

FIG. 3 is a simplified block diagram of an example first access node, such as 4G eNB 14, showing some of the components that could be included in the access node in a non-limiting example implementation. As shown, the example first access node includes a wireless communication interface 48, a backhaul communication interface 50, and a controller 52, which could be integrated or communicatively linked together by a system bus, network, or other connection mechanism 54 and/or could be integrated together or distributed in various ways.

The wireless communication interface 48 could include an antenna structure (e.g., a MIMO antenna array, possibly a massive-MIMO array) 56, a transceiver 58, and a power amplifier 60, among one or more other RF components, to cooperatively facilitate air interface communication with UEs served by the first access node. Thus, through the wireless communication interface including the antenna structure, the first access node could be configured to provide coverage and service on a representative radio access technology as described above.

The backhaul communication interface 50 could comprise a wired or wireless network communication module, such as an Ethernet interface, through which to communicate with other entities, perhaps with the second access node and/or with one or more other entities on or via a core network.

And the controller 52 could be configured to carry out various the operations described herein. For instance, the controller could comprise a processing unit 62 including one or more processors (e.g., general purpose microprocessors and/or dedicated processing units), non-transitory data storage 64 (e.g., one or more volatile and/or non-volatile storage components, such as magnetic, optical or flash storage), and program instructions 66 stored in the non-transitory data storage and executable by the processing unit 62 to cause the first access node to carry out the various operations described herein.

For example, in line with the discussion above, the controller 52 could cause the first access node to serve, through the wireless communication interface, a plurality of UEs each over a respective first connection between the UE and the first access node. The controller 52 could also cause the first access to engage, using the wireless communication interface, in a plurality of connection-addition processes, each connection-addition process being for a respective UE of the plurality of UEs and being to add for the UE a second connection with a second access node, where adding the second connection enables the UE to be served with dual connectivity by (i) the first access node over the first connection between the UE and the first access node and (ii) the second access node over the second connection between the UE and the second access node.

Additionally, the controller 52 could cause the first access node to detect threshold many connection-addition failures of the plurality of connection-addition processes, the connection-addition failures occurring for UEs when the UEs are located at geolocations. Further, the controller 52 could cause the first access node to determine the geolocations where UEs were located when the UEs experienced the connection-addition failures an, responsive to detecting the threshold many connection-addition failures, could cause the first access node to use the determined geolocations as a basis to reconfigure the second access node from having a first geographic coverage area to instead having a second geographic coverage area.

Various other features discussed above can be implemented in this context, and vice versa.

Figure 4:
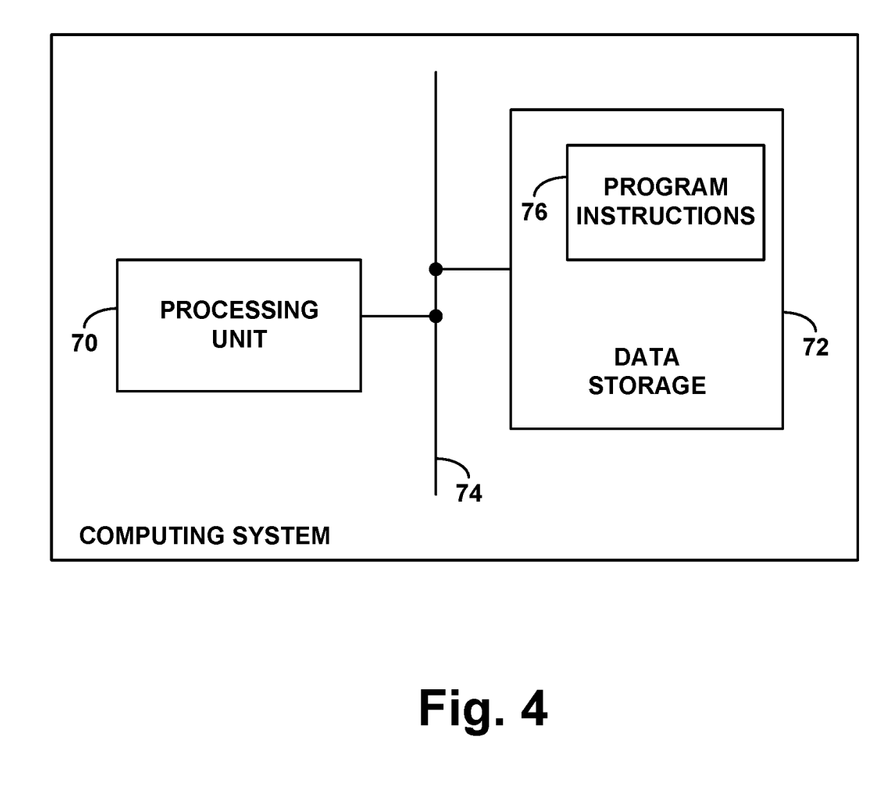
FIG. 4 is a simplified block diagram of an example computing system operable in accordance with the disclosure.

Finally, FIG. 4 is a simplified block diagram of a computing system that could carry out various features as discussed above. This computing system could be incorporated in an first access node, such as 4G eNB 14, an EMS, or one or more other entities for instance. As shown in FIG. 4, the computing system includes a processing unit 70 and non-transitory data storage 72, which could be integrated or communicatively linked together by a system bus, network, or other connection mechanism 74.

The processing unit 70 could comprise one or more processors, such as one or more microprocessors or specialized processors. And the data storage 72 could comprise on or more volatile and/or non-volatile storage components, such as magnetic, optical, or flash storage media. As further shown, the data storage could hold, store, encode, or otherwise embody program instructions 76. In a representative implementation, those program instructions 76 could be executable by the processing unit 70 to carry out various operations as described above.

For instance, these operations could include (i) detecting threshold many connection-addition failures of a plurality of connection-addition processes, each connection-addition process being for a respective UE of a plurality of UEs that are served by a first access node and being to add for the respective UE a second connection with a second access node, where the connection-addition failures occur for UEs when the UEs are located at geolocations, (ii) determining the geolocations where UEs were located when the UEs experienced the connection-addition failures; and (iii) responsive to detecting the threshold many connection-addition failures, using the determined geolocations as a basis to reconfigure the second access node from having a first geographic coverage area to instead having a second geographic coverage area.

Various other features discussed above can be implemented in this context, and vice versa.

Further, while the foregoing focuses on dual connectivity defined as involving service concurrently on two or more different RATs, the features described could extend as well to apply with respect to a single RAT, such as where a UE is connected with a first access node under a given RAT and at issue is adding for the UE of a second connection under the same RAT with a second access node to facilitate having the UE be served concurrently by both access nodes under that RAT.

Exemplary embodiments have been described above. Those skilled in the art will understand, however, that changes and modifications may be made to these embodiments without departing from the true scope and spirit of the invention.

I claim:

1. A method comprising:
   serving, by a first access node, a plurality of UEs each over a respective first connection with the first access node;
   engaging, by the first access node, in a plurality of connection-addition processes, each connection-addition process being for a respective UE of the plurality of UEs and being to add for the UE a second connection with a second access node, wherein adding the second connection enables the UE to be served with dual connectivity by (i) the first access node over the first connection between the UE and the first access node and (ii) the second access node over the second connection between the UE and the second access node;
   detecting threshold many connection-addition failures of the plurality of connection-addition processes, the connection-addition failures occurring for UEs when the UEs are located at geolocations;
   determining the geolocations where the UEs were located when the UEs experienced the connection-addition failures; and
   responsive to detecting the threshold many connection-addition failures, using the determined geolocations as a basis to reconfigure the second access node from having a first geographic coverage area to instead having a second geographic coverage area.

2. The method of claim 1, wherein the detecting is performed by the first access node.

3. The method of claim 1, wherein the detecting is performed by an element management system communicatively connected to the first access node and the second access node.

4. The method of claim 1, wherein detecting the threshold many connection-addition failures of the plurality of connection-addition processes comprises detecting at least a predefined threshold quantity of connection-addition failures of the plurality of connection-addition processes, the predefined threshold quantity being at least two.

5. The method of claim 1, wherein detecting the threshold many connection-addition failures of the plurality of connection-addition processes comprises detecting at least a predefined threshold rate of connection-addition failures of the plurality of connection-addition processes.

6. The method of claim 1, wherein detecting the threshold many connection-addition failures of the plurality of connection-addition processes comprises detecting threshold many connection-addition failures of the plurality of connection-addition processes over a sliding window of time.

7. The method of claim 1, wherein detecting the threshold many connection-addition failures of the plurality of connection-addition processes comprises receiving, for each of the connection-addition failures, from a UE that experienced the connection-addition failure, a connection-addition failure report indicating that the UE experienced the connection-addition failure.

8. The method of claim 1, wherein reconfiguring the second access node from having the first geographic coverage area to instead having the second geographic coverage area comprises reconfiguring the second access node so that the second access node provides improved coverage at the determined geolocations.

9. The method of claim 8, wherein the first access node has access to data that defines mappings between (i) antenna configurations for the second access node and (ii) geographic coverage areas of the second access node, wherein the second access node has a first antenna configuration, and wherein reconfiguring the second access node so that the second access node provides improved coverage at the determined geolocations comprises:
- selecting, from the mappings, a second antenna configuration with an associated geographic coverage area that encompasses a geographic area defined by the determined geolocations; and
- reconfiguring the second access node from having the first antenna configuration to instead having the second antenna configuration.

10. The method of claim 9, wherein reconfiguring the second access node from having the first antenna configuration to instead having the second antenna configuration comprises adjusting one or more antenna parameters of the second access node, the one or more antenna parameters selected from a group consisting of azimuth, beamwidth, and tilt.

11. The method of claim 1, wherein reconfiguring the second access node comprises transmitting, to the second access node, a directive to which the second access node is configured to respond by reconfiguring itself from having the first geographic coverage area to instead having the second geographic coverage area.

12. The method of claim 1, wherein reconfiguring the second access node comprises generating a trouble-ticket containing instructions to transition the second access node from having the first geographic coverage area to instead having the second geographic coverage area.

13. The method of claim 1, wherein the first connection between the UE and the first access node is according to a first radio access technology (RAT) and wherein the second connection between the UE and the second access node is according to a second RAT.

14. The method of claim 1, wherein at least one of the connection-addition failures involves, during the connection-addition process for the respective UE, the UE failing to detect a synchronization signal block (SSblock) broadcast by the second access node.

15. The method of claim 1, wherein at least one of the connection-addition failures involves, during the connection-addition process for the respective UE, failure of random-access signaling between the UE and the second access node.

16. A first access node comprising:
- a wireless communication interface through which the first access node is configured to engage in air-interface communications; and
- a controller comprising at least one processing unit, non-transitory data storage, and program instructions stored in the non-transitory data storage and executable by the at least one processing unit to cause the first access node to carry out operations comprising:
  - serving, through the wireless communication interface, a plurality of UEs each over a respective first connection between the UE and the first access node;
  - engaging, using the wireless communication interface, in a plurality of connection-addition processes, each connection-addition process being for a respective UE of the plurality of UEs and being to add for the UE a second connection with a second access node, wherein adding the second connection enables the UE to be served with dual connectivity by (i) the first access node over the first connection between the UE and the first access node and (ii) the second access node over the second connection between the UE and the second access node;
  - detecting threshold many connection-addition failures of the plurality of connection-addition processes, the connection-addition failures occurring for UEs when the UEs are located at geolocations;
  - determining the geolocations where UEs were located when the UEs experienced the connection-addition failures; and
  - responsive to detecting the threshold many connection-addition failures, using the determined geolocations as a basis to reconfigure the second access node from having a first geographic coverage area to instead having a second geographic coverage area.

17. The first access node of claim 16, wherein detecting the threshold many connection-addition failures of the plurality of connection-addition processes comprises receiving, for each of the connection-addition failures, from a UE that experienced the connection-addition failure, a connection-addition failure report indicating that the UE experienced the connection-addition failure.

18. The first access node of claim 16, wherein reconfiguring the second access node from having the first geographic coverage area to instead having the second geographic coverage area comprises reconfiguring the second access node so that the second access node provides improved coverage at the determined geolocations.

19. The first access node of claim 18, wherein the first access node has access to data that defines mappings between (i) antenna configurations for the second access node and (ii) geographic coverage areas of the second access node, wherein the second access node has a first antenna configuration, and wherein reconfiguring the second access node so that the second access node provides improved coverage at the determined geolocations comprises:
- selecting, from the mappings, a second antenna configuration with an associated geographic coverage area that encompasses a geographic area defined by the determined geolocations; and
- reconfiguring the second access node from having the first antenna configuration to instead having the second antenna configuration.

20. A computing system comprising:
- a processing unit;
- non-transitory data storage; and
- program instructions stored in the data storage and executable by the processing unit to carry out operations including:
  - detecting threshold many connection-addition failures of a plurality of connection-addition processes, each connection-addition process being for a respective UE of a plurality of UEs that are served by a first access node and being to add for the respective UE a second connection with a second access node, wherein the connection-addition failures occur for UEs when the UEs are located at geolocations;
  - determining the geolocations where UEs were located when the UEs experienced the connection-addition failures; and
  - responsive to detecting the threshold many connection-addition failures, using the determined geolocations as a basis to reconfigure the second access node from having a first geographic coverage area to instead having a second geographic coverage area.

* * * * *